United States Patent
Visoky et al.

(10) Patent No.: US 11,477,012 B2
(45) Date of Patent: Oct. 18, 2022

(54) CRYPTOGRAPHIC FEATURE LICENSING

(71) Applicant: Rockwell Automation Technologies, Inc., Mayfield Heights, OH (US)

(72) Inventors: Jack Michael Visoky, Willoughby, OH (US); Diane E. Golden, West Allis, WI (US); Benjamin H. Nave, Shaker Heights, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 237 days.

(21) Appl. No.: 16/580,590

(22) Filed: Sep. 24, 2019

(65) Prior Publication Data
US 2021/0091930 A1    Mar. 25, 2021

(51) Int. Cl.
| | |
|---|---|
| H04L 29/06 | (2006.01) |
| H04L 9/08 | (2006.01) |
| G05B 19/418 | (2006.01) |
| H04L 9/00 | (2022.01) |
| H04L 9/32 | (2006.01) |

(52) U.S. Cl.
CPC ........ *H04L 9/0825* (2013.01); *G05B 19/4185* (2013.01); *H04L 9/006* (2013.01); *H04L 9/3247* (2013.01); *H04L 9/3263* (2013.01)

(58) Field of Classification Search
CPC ..... H04L 9/0825; H04L 9/006; H04L 9/3247; H04L 9/3263; G05B 19/4185; G06F 21/629; G06F 21/10
See application file for complete search history.

(56) References Cited

U.S. PATENT DOCUMENTS

| | | |
|---|---|---|
| 5,473,692 A | 12/1995 | Davis |
| 7,143,297 B2 | 11/2006 | Buchheit |
| 8,015,409 B2 | 9/2011 | Wilkinson, Jr. |
| 8,484,474 B2 | 7/2013 | Batke et al. |

(Continued)

FOREIGN PATENT DOCUMENTS

EP    3232604 A1    10/2017

OTHER PUBLICATIONS

Extended European Search Report for EP Application No. 20190173.3; filed Aug. 10, 2020; dated Feb. 26, 2021.

*Primary Examiner* — Joseph P Hirl
*Assistant Examiner* — Leynna Truvan

(57) ABSTRACT

Techniques to facilitate feature licensing of industrial devices employed in an industrial automation environment are disclosed herein. In at least one implementation, a security certificate for an industrial device is provisioned based on a first private key associated with the industrial device, wherein the first private key is securely stored in a hardware root of trust within the industrial device. A device information package for the industrial device is generated based on the security certificate, wherein the device information package is encrypted with a first public key paired with the first private key and signed by a certificate authority using a second private key. The device information package is provided to the industrial device, wherein the industrial device is configured to validate the device information package using a second public key paired with the second private key and decrypt the device information package with the first private key.

20 Claims, 6 Drawing Sheets

(56) References Cited

U.S. PATENT DOCUMENTS

| | | |
|---|---|---|
| 2006/0085646 A1* | 4/2006 | Cutter, Jr. ............... G06F 21/10 |
| | | 713/175 |
| 2008/0082449 A1 | 4/2008 | Wilkinson et al. |
| 2014/0108786 A1* | 4/2014 | Kreft .................... H04L 9/0643 |
| | | 713/156 |
| 2018/0191508 A1* | 7/2018 | Scriber .................. G06F 21/57 |
| 2019/0313246 A1* | 10/2019 | Nix ....................... H04L 9/3263 |

* cited by examiner

CRYPTOGRAPHIC FEATURE LICENSING

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial controller systems. Machine builders, solution providers, and other content creators typically produce the control logic needed to run on these controllers to control the machines.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial controller system that controls a machine. For example, an operator might use the HMI to direct the control system to update drive parameters, turn on a pump, speed-up a motor, or stop a robot.

OVERVIEW

Techniques to facilitate feature licensing of industrial devices employed in an industrial automation environment are disclosed herein. In at least one implementation, a security certificate for an industrial device is provisioned based on a first private key associated with the industrial device, wherein the first private key is securely stored in a hardware root of trust within the industrial device. A device information package for the industrial device is generated based on the security certificate for the industrial device, wherein the device information package is encrypted with a first public key paired with the first private key associated with the industrial device and the device information package is signed by a certificate authority using a second private key associated with the certificate authority. The device information package is provided to the industrial device, wherein the industrial device is configured to validate the device information package using a second public key paired with the second private key associated with the certificate authority and decrypt the device information package with the first private key associated with the industrial device.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
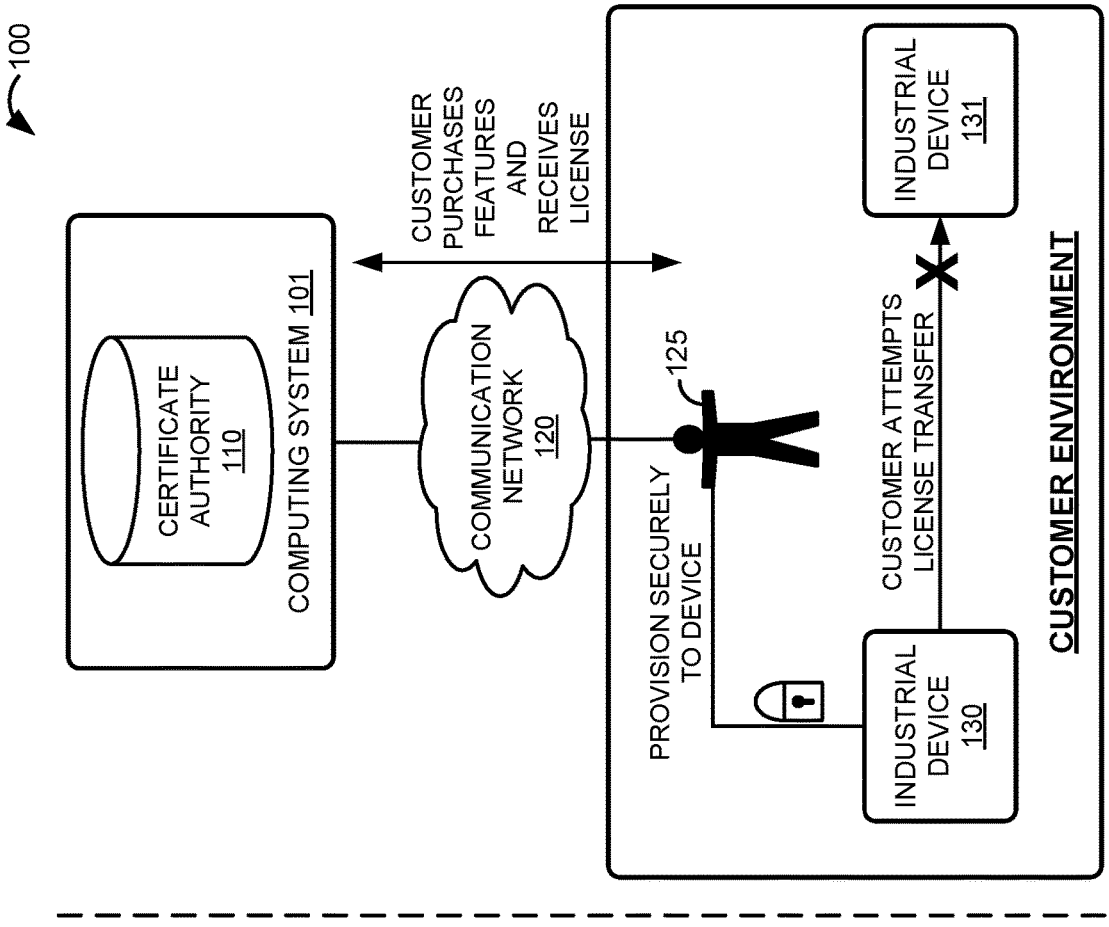
FIG. 1 is a block diagram that illustrates a communication system in an exemplary implementation.
Figure 1:
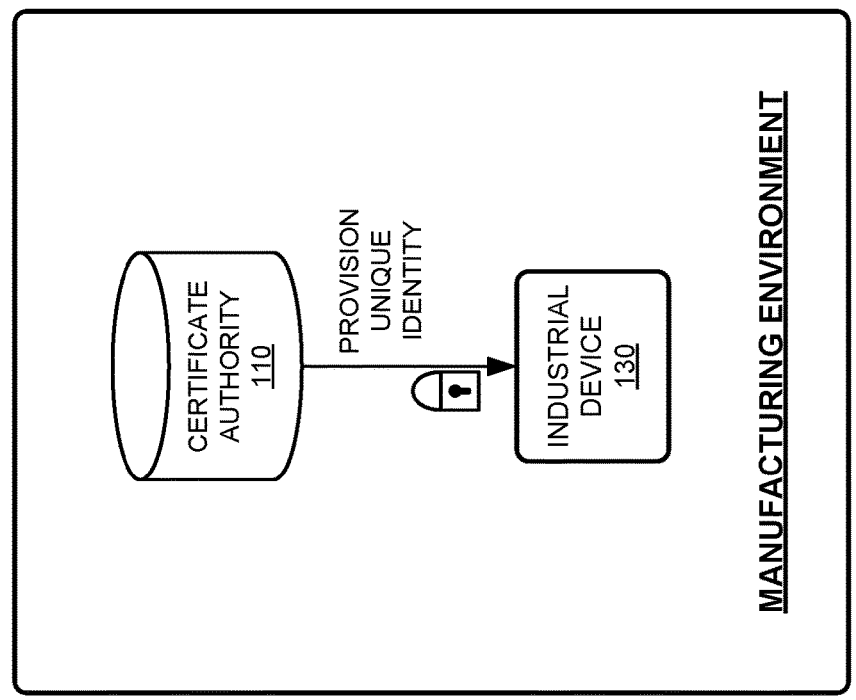

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various industrial devices are often employed in industrial automation environments, such as controllers, drives, communication modules, HMI devices, and other industrial equipment. Manufacturers of industrial devices often desire to control the use of certain features and functionality of a device through various licensing schemes. Feature licensing can provide a useful way to monetize device functionality and allow for a better user experience. However, many licensing schemes have inherent weaknesses, and difficulties can arise in securely provisioning and enforcing the licenses. For example, unscrupulous users often attempt to circumvent a licensing scheme by employing scripts or applications intended to unlock features and functionality of industrial devices without purchasing a license, or might even attempt some reverse engineering techniques to extract data stored within hardware.

Implementations disclosed herein provide for secure feature licensing and management of user operations on industrial devices. In at least one implementation, strong cryptography is applied to an industrial device with a hardware protected root of trust to ensure license information is unique to that specific hardware instance. For example, a hardware-based root of trust may be installed into an industrial device at the time of manufacture, and private cryptographic keys unique to the device may then be stored securely within the root of trust. In some implementations, a security certificate is provisioned to the device that provides strong identity information, including product type. The security certificate may be tied to the private key of the device so the certificate cannot be used on any other device. In order to license particular features of the device to an end user, a device information package may be provided to the user that is signed via a different root of trust associated with a security authority and is encrypted with the public key specific to the device. Generally, a second public key associated with the different root of trust of the security authority would be stored securely within the hardware root of trust of the device in order to verify the signature of the security authority and authenticate the device information package. In some implementations, the device information package may provide encrypted licensing information to the device about the specific behaviors and features which are enabled on the device. Since the licensing data in the device information package is encrypted with the device's public key, the license is tied to that specific device, and thus cannot be used on a different device that lacks the device's private key needed to decrypt the license data. Beneficially, the strong root of trust provisioned in the hardware of the industrial device when manufactured, combined with the unique identity of the device provided by the device's private key and associated security certificate, enable the ability to securely provision and license features of the device to an end user. In this manner, license information can be provisioned online or offline while still ensuring that the license cannot be used on different devices or transferred to another device without the involvement of the authoritative system.

Figure 2:
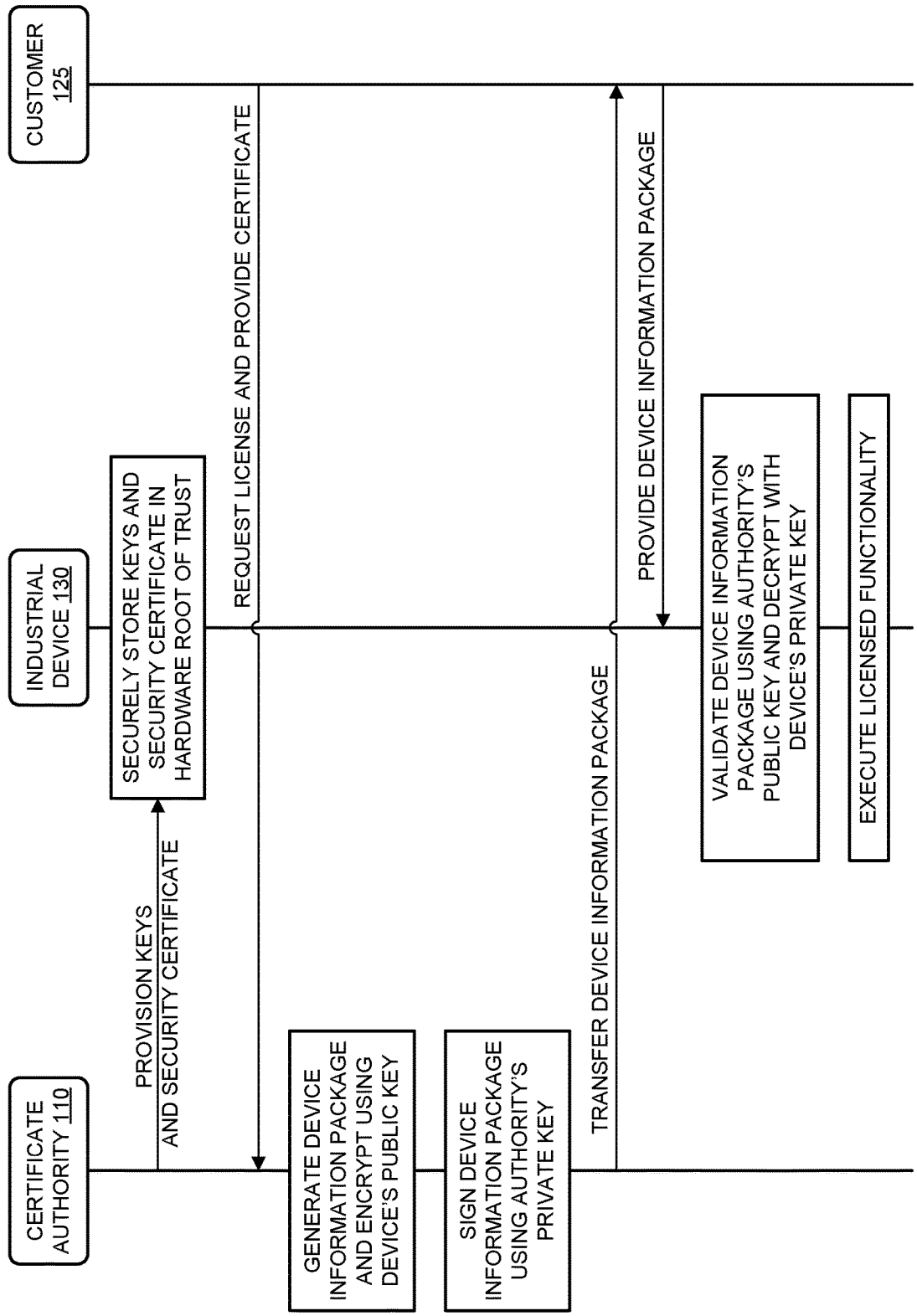
FIG. 2 is a sequence diagram that illustrates an operation to securely license functionality for an industrial device in an exemplary implementation.
Figure 3:
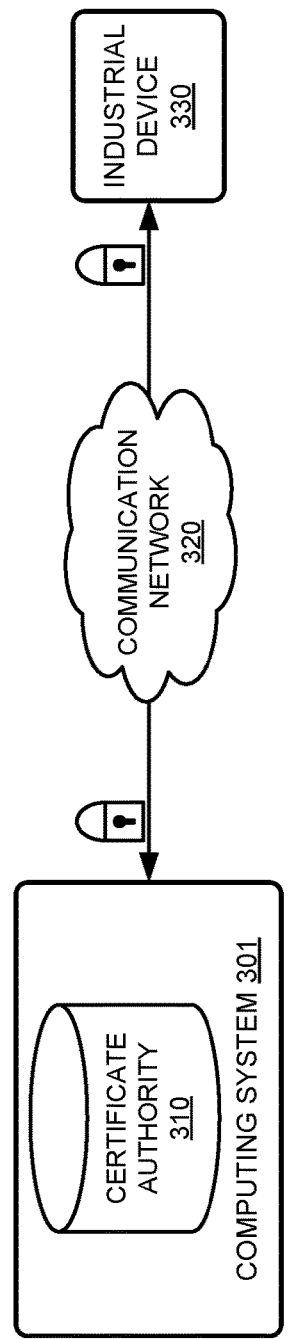
FIG. 3 is a block diagram that illustrates a communication system in an exemplary implementation.
Figure 4:
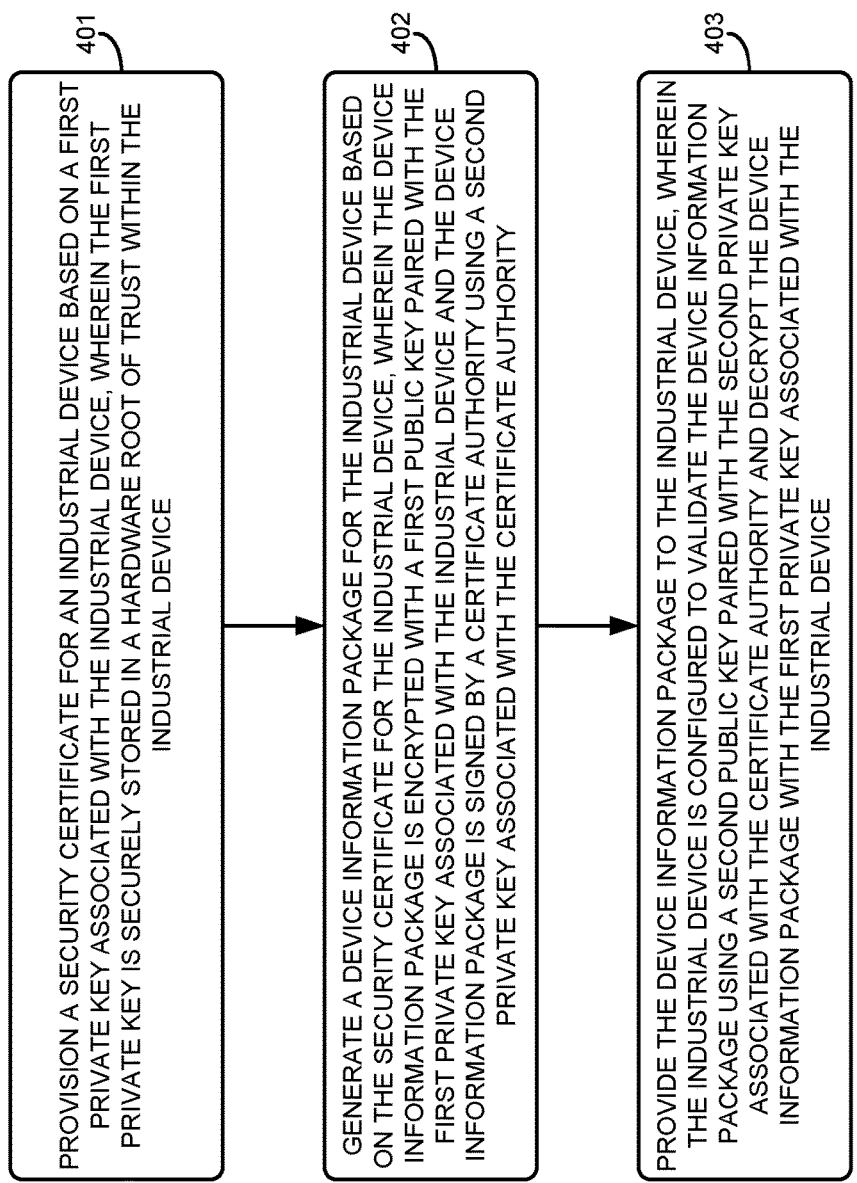
FIG. 4 is a flow diagram that illustrates an operation of a communication system in an exemplary implementation.
Figure 5:
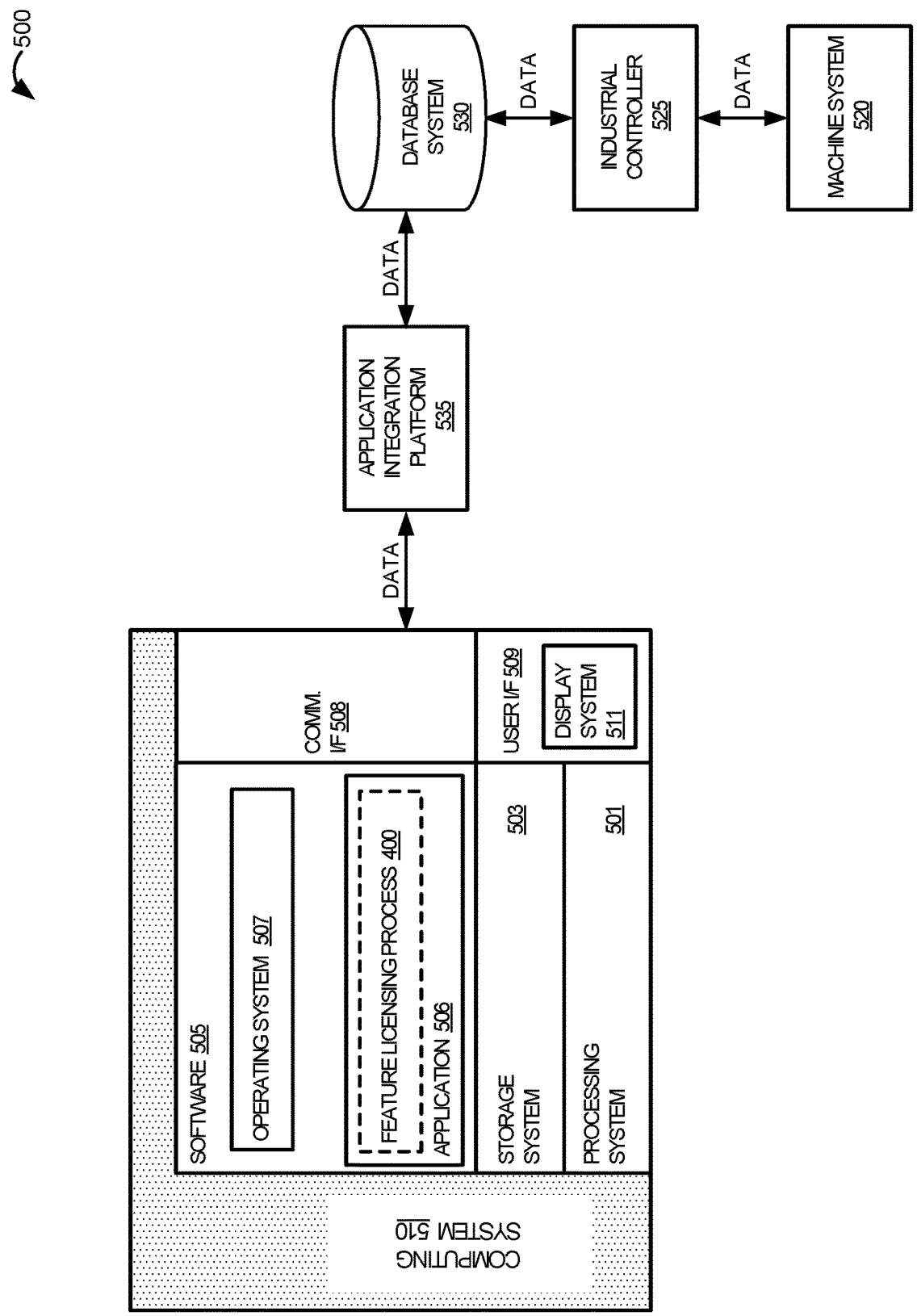
FIG. 5 is a block diagram that illustrates an operational scenario involving a computing system in an industrial automation environment in an exemplary implementation.
Figure 6:
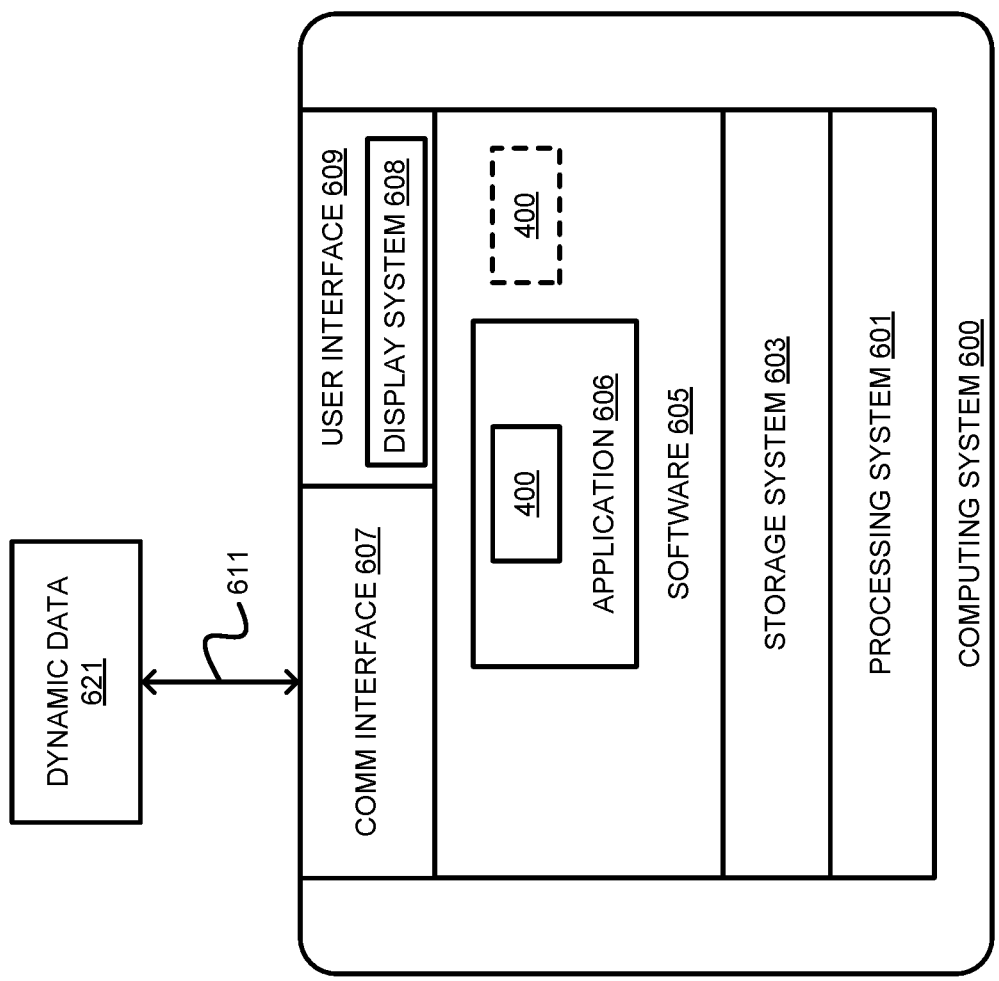
FIG. 6 is a block diagram that illustrates a computing system in an exemplary implementation.

Referring now to the drawings, FIG. 1 illustrates an exemplary communication system, and FIG. 2 illustrates a sequence diagram of an operation to securely license functionality for an industrial device in an exemplary implementation. FIG. 3 illustrates another exemplary communication system, and FIG. 4 illustrates a flow diagram of an operation to facilitate feature licensing of industrial devices employed in an industrial automation environment in an exemplary implementation. FIG. 5 illustrates an exemplary industrial automation environment that includes a computing system that may be used to execute a feature licensing process, and FIG. 6 illustrates an exemplary computing system that may be used to perform any of the processes and operational scenarios described herein.

Turning now to FIG. 1, a block diagram that illustrates communication system 100 in an exemplary implementation is shown. Communication system 100 includes a manufacturing environment and a customer environment. The manufacturing environment includes certificate authority 110 and industrial device 130, and the customer environment includes customer 125, industrial device 130, and industrial device 131. As shown in FIG. 1, the elements of the customer environment are in communication with computing system 101 and certificate authority 110 over communication network 120. In some examples, the customer environment of communication system 100 could comprise an industrial automation environment, such as an automobile manufacturing factory, food processing plant, oil drilling operation, microprocessor fabrication facility, or some other type of industrial enterprise. Industrial devices 130 and 131 could comprise industrial controllers, motion drives, communication devices, sensors, data transmitters, HMI hardware systems, and other industrial automation equipment. In some examples, where industrial device 130 comprises an industrial controller, industrial device 130 could comprise an automation control system that drives the operation of industrial machinery, such as a programmable logic controller (PLC), programmable automation controller (PAC), or any other controller used in automation control. In some examples, industrial device 130 could comprise a ControlLogix® control system provided by Rockwell Automation, Inc.

Communication system 100 provides an example of a communication system in which any of the feature licensing processes and operational scenarios described herein may be implemented. The techniques described below with respect to FIG. 1 could be executed by the systems of communication system 100 such as computing system 101, certificate authority 110, and industrial device 130, and could be combined with operation 400 of FIG. 4 in some implementations.

In operation, a unique identity is provisioned to industrial device 130 from certificate authority 110 at the time of device manufacture, as illustrated in the manufacturing environment of FIG. 1. For example, the manufacturer of industrial device 130 could utilize certificate authority 110 to generate a unique identity for device 130 during manufacture, and then securely embed the unique identity into the hardware of device 130, such as a hardware-based cryptographic root of trust, which is indicated graphically in FIG. 1 by the lock icon. In some implementations, the unique identity for industrial device 130 could utilize a public key infrastructure (PKI), such that the unique identity for device 130 is provided by a private key generated by certificate authority 110 and embedded into the hardware root of trust within industrial device 130. In at least one implementation, industrial device 130 could generate the public/private key pair internally within its own trusted hardware, and the private key may then be stored securely within the hardware-based root of trust. The private key that is securely stored in the hardware root of trust of device 130 provides a unique identity of device 130 in that the private key is specifically associated with industrial device 130 and no other industrial device. The public key that is paired with the private key of industrial device 130 may then be stored by certificate authority 110 for subsequent use to encrypt licensing information for device 130.

In some implementations, to provision the unique identity for industrial device 130, certificate authority 110 could provision a security certificate to device 130 for storage in the hardware root of trust of device 130 at the time of device manufacture. The security certificate is specific to the private key of industrial device 130. For example, the security certificate for device 130 may be generated by certificate authority 110 using the private key specific to device 130. The security certificate provides strong identity information for industrial device 130, including the device type, and uniquely identifies the specific industrial device 130 of that device type. The security certificate may be signed by certificate authority 110 so that the security certificate could later be validated and verified by certificate authority 110 as authentic. Accordingly, industrial device 130 may be uniquely identified by the security certificate provisioned for device 130 during manufacture based on the private key specific to device 130. Further, in at least one implementation, a public key of an authoritative system, such as certificate authority 110 in this example, could also be stored in the hardware root of trust of device 130 at the time of manufacture, which could later be used by device 130 to validate license information received by device 130 that is signed by the corresponding private key of the authoritative system.

After industrial device 130 is provisioned with a unique identity, device 130 may be sold to and operated by a customer 125, as illustrated in the customer environment of FIG. 1. In order to activate specific features and functionality of industrial device 130, customer 125 may purchase a license to enable one or more functions of industrial device 130. For example, an authoritative entity, such as the manufacturer of industrial device 130, could utilize certificate authority 110 with computing system 101 to securely provision feature licenses for industrial device 130 over communication network 120 as purchased by customer 125 in real time. Accordingly, in some implementations, certificate authority 110 could be utilized to provide runtime licensing through a cloud gateway over communication network 120. In this manner, the license information can be provisioned online or offline, yet cannot be compromised or transferred without going back to the authoritative system for approval.

In at least one implementation, in order to purchase a feature license, the customer 125 could present the signed security certificate for industrial device 130 to certificate authority 110. Certificate authority 110 could then validate the certificate using the public key that corresponds to the private key that was used by authority 110 to sign the certificate, and thereby validate the certificate as authentic. Since the security certificate is unique to that specific industrial device 130, certificate authority 110 could then utilize the security certificate to generate a license for the features and functionality that customer 125 desires to activate on device 130. For example, the certificate authority 110 could utilize the security certificate of industrial device 130 to generate a feature license unique to device 130 by encrypting the license with the public key that corresponds to the private key unique to device 130. In this manner, the license generated using the security certificate provisioned to industrial device 130 would therefore only be effective to unlock the specified features on industrial device 130, because only device 130 possesses the unique private key necessary to decrypt the license information. Further, in some implementations, certificate authority 110 could include the feature license for industrial device 130 in a device information package, which could then be encrypted using the public key corresponding to the private key stored in device 130, and could then sign the device information package using the private key associated with and controlled by certificate authority 110.

Upon receipt of the device information package, customer 125 could securely provision the device information package to industrial device 130 in order to apply the license and activate the licensed functionality. Industrial device 130 would retrieve the public key stored in the hardware root of trust that corresponds to the private key of certificate authority 110 and utilize the public key of authority 110 to validate the signed device information package and verify that the device information package comprises authentic data provided by certificate authority 110. Upon successful validation, industrial device 130 could then utilize the private key stored in the hardware root of trust to decrypt the device information package that was encrypted by certificate authority 110 using the public key corresponding to the private key of device 130. Upon successful decryption, industrial device 130 is then able to apply the license and activate the licensed features of device 130.

Beneficially, by utilizing a strong root of trust in hardware to securely store a security certificate and cryptographic keys that provide a unique identity of an industrial device 130, the techniques described herein provide for secure provisioning of feature licensing for that specific, individual device 130. For example, if customer 125 later attempts to transfer the license provisioned to industrial device 130 to a different industrial device 131, the license would not be enabled for device 131 because device 131 lacks the private key specific to device 130 that is necessary to decrypt the device information package and obtain the license. Instead, in order to transfer the license for industrial device 130 to another device 131, customer 125 would have to contact certificate authority 110 to authorize the license transfer. In order to transfer the license, certificate authority 110 would first issue a revocation of that license to deactivate the old industrial device 130, and then issue a new license and new device information package specific to the new industrial device 131 by using the security certificate unique to device 131, which could be used to enable the licensed functionality on that new device 131. The revocation of the license on the old device 130 could be verified by certificate authority 110 through device 130 returning the revocation request signed with its own public key unique to device 130. In this manner, certificate authority 110 can verify that the revocation actually reached the old device 130 that the revocation was intended for and was acted upon. Another exemplary operation of communication system 100 will now be discussed with respect to the sequence diagram of FIG. 2.

FIG. 2 illustrates a sequence diagram of an operation to securely license functionality for industrial device 130 in an exemplary implementation. The techniques described below with respect to FIG. 2 could be executed by the systems of communication system 100 such as computing system 101, certificate authority 110, and industrial device 130, and could be combined with operation 400 of FIG. 4 in some implementations.

Initially, certificate authority 110 provisions cryptographic keys and a security certificate for industrial device 130 at the time of device manufacture. For example, certificate authority 110 could generate a public and private encryption key pair that is unique to industrial device 130, and provision the private key to device 130 during manufacture of the device. The private key could then be securely stored by embedding the key into a hardware-based root of trust within industrial device 130, such as a secure cryptographic storage device. In at least one implementation, industrial device 130 could generate the public/private key pair internally within its own trusted hardware, and the private key may then be stored securely within the hardware-based root of trust. In some implementations, the public key that corresponds to the private key of industrial device 130 could be stored by certificate authority 110 for subsequent encryption of license information for device 130.

Certificate authority 110 could also provision a public key belonging to certificate authority 110 for secure storage embedded into the hardware root of trust within industrial device 130. The public key associated with certificate authority 110 could later be used by industrial device 130 to validate license information received from certificate authority 110 that is cryptographically signed through encryption by the corresponding private key of certificate authority 110.

Certificate authority 110 also generates and provisions a security certificate for industrial device 130, which provides a unique identity of industrial device 130. In some implementations, the security certificate is specific to the private key assigned to industrial device 130. For example, certificate authority 110 could generate the security certificate for industrial device 130 based on the unique private key generated by device 130. The security certificate may be securely stored in industrial device 130 by embedding the certificate into the hardware-based root of trust within device 130. The security certificate may be cryptographically signed by certificate authority 110 using a private key specific to certificate authority 110 so that the security certificate could later be validated and verified by certificate authority 110 as authentic. In some implementations, the security certificate could comprise the public key that corresponds to the private key associated with industrial device 130.

After industrial device 130 is provisioned with a unique identity provided by the keys and security certificate embedded into its hardware root of trust, device 130 is purchased and operated by customer 125. In order to activate specific features and functionality of industrial device 130, customer 125 may request a license to enable one or more functions of industrial device 130. For example, in order to purchase a feature license, customer 125 could provide the signed security certificate for industrial device 130 to certificate authority 110. Certificate authority 110 could then validate the certificate using the public key corresponding to the private key that was used by authority 110 to sign the certificate, and thereby validate the certificate as authentic. Since the security certificate is unique to that specific industrial device 130, certificate authority 110 could then utilize the security certificate to generate a device information package containing a license for the features and functionality that customer 125 desires to activate on device 130. For example, certificate authority 110 could utilize the security certificate of industrial device 130 to generate a device information package containing a feature license unique to device 130 by encrypting the device information package with the public key that corresponds to the private key unique to device 130. In this manner, the license generated using the security certificate provisioned to industrial device 130 would therefore only be effective to unlock the specified features on industrial device 130, because only device 130 possesses the unique private key necessary to decrypt the license information. In some implementations, the security certificate for industrial device 130 received by certificate authority 110 comprises the public key that is paired with the private key unique to device 130. In this case, certificate authority 110 could validate the security certificate using the public key of authority 110 that corresponds to the private key that was used by authority 110 to sign the certificate and recover the public key assigned to device 130, and then use the public key assigned to device 130 to encrypt the device information package containing a feature license unique to device 130.

After encrypting the device information package using the public key assigned to device 130, certificate authority 110 could then cryptographically sign the device information package by using the private key assigned to certificate authority 110. Certificate authority 110 then transfers the signed device information package for delivery to customer 125 for deployment to industrial device 130.

Upon receipt of the device information package, customer 125 securely provisions the device information package to industrial device 130 in order to apply the license and activate the licensed functionality. When the device information package is provided to industrial device 130, device 130 validates the device information package using the public key assigned to certificate authority 110. For example, industrial device 130 could retrieve the public key stored in the hardware root of trust that corresponds to the private key of certificate authority 110 and utilize the public key of authority 110 to validate the signed device information package and verify that the device information package comprises authentic data provided by certificate authority 110. Upon successful validation, industrial device 130 could then utilize the private key stored in the hardware root of trust to decrypt the device information package that was encrypted by certificate authority 110 using the public key corresponding to the private key of device 130. Upon successful decryption, industrial device 130 is then able to apply the license and execute the licensed functionality of device 130.

Beneficially, by employing security authority 110 to provision a security certificate and cryptographic keys that provide a unique identity of an industrial device 130 for secure storage in a hardware root of trust, the techniques described herein provide for secure provisioning of feature licensing for a particular industrial device 130. Another exemplary industrial automation environment that may be utilized to implement the feature licensing processes and operational scenarios described herein will now be discussed with respect to FIG. 3.

FIG. 3 is a block diagram that illustrates communication system 300 in an exemplary implementation. Communication system 300 provides an example of a communication system in which any of the feature licensing processes and operational scenarios described herein may be implemented. The techniques described below with respect to FIG. 3 could also be executed by the systems of communication system 100 such as computing system 101, certificate authority 110, and industrial device 130, and could be combined with the operations of FIGS. 2 and 4 in some implementations.

Communication system 300 includes computing system 301, certificate authority 310, communication network 320, and industrial device 330. In this example, computing system 301 loads and executes certificate authority 310 to provide the functionality attributed to the certificate authority as described herein. In some examples, industrial device 330 could be deployed for operation in an industrial automation environment, such as an automobile manufacturing factory, food processing plant, oil drilling operation, microprocessor fabrication facility, or some other type of industrial enterprise. For example, industrial device 330 could comprise an industrial controller, motion drive, communication device, sensor, data transmitter, HMI hardware system, and other industrial automation equipment. In some examples, where industrial device 130 comprises an industrial controller, industrial device 330 could comprise an automation control system that drives the operation of industrial machinery, such as a programmable logic controller (PLC), programmable automation controller (PAC), or any other controller used in automation control. In some examples, industrial device 330 could comprise a ControlLogix® control system provided by Rockwell Automation, Inc. An exemplary operation of communication system 300 to facilitate feature licensing of industrial devices employed in an industrial automation environment will now be discussed with respect to FIG. 4.

FIG. 4 is a flow diagram that illustrates an operation 400 of a communication system in an exemplary implementation. The operation 400 shown in FIG. 4 may also be referred to as feature licensing process 400 herein. The steps of the operation are indicated below parenthetically. The following discussion of operation 400 will proceed with reference to computing system 301, certificate authority 310, and industrial controller 330 of FIG. 3 in order to illustrate its operations, but note that the details provided in FIG. 3 are merely exemplary and not intended to limit the scope of process 400 to the specific implementation shown in FIG. 3.

Operation 400 may be employed to operate computing system 301 to facilitate feature licensing of industrial devices employed in an industrial automation environment. As shown in the operational flow of process 400, computing system 301 provisions a security certificate for industrial device 330 based on a first private key associated with industrial device 330, wherein the first private key is securely stored in a hardware root of trust within industrial device 330 (401). In at least one implementation, computing system 301 utilizes certificate authority 310 in order to provision the security certificate for industrial device 330. For example, computing system 301 could load and execute certificate authority 310 in order to generate the security certificate for industrial device 330 based on the first private key associated with industrial device 330. In some implementations, computing system 301 could execute certificate authority 310 or some other program instructions to generate a unique public/private key pair for industrial device 330, and the private key of this pair could then be securely stored in a hardware root of trust within industrial device 330. For example, certificate authority 310 could generate a first public and private key pair that is unique to industrial device 330, and provision the first private key to device 330 at the time of manufacture. The first private key could then be securely stored by embedding the first private key into a hardware-based root of trust within industrial device 330, such as a secure cryptographic storage device. In at least one implementation, industrial device 330 could generate the public/private key pair internally within its own trusted hardware, and the first private key may then be stored securely within the hardware-based root of trust. In some implementations, the first public key that corresponds to the first private key associated with industrial device 330 could be stored by certificate authority 310 for subsequent encryption of license information for device 330.

In at least one implementation, computing system 301 could utilize certificate authority 310 to generate and provision a unique security certificate for industrial device 330, which provides a unique identity of industrial device 330. In some implementations, the security certificate is specific to the first private key assigned to industrial device 330. For example, computing system 301 could execute certificate authority 310 to generate the security certificate for industrial device 330 based on the unique first private key assigned to device 330. The security certificate may also be securely stored in industrial device 330 by embedding the security certificate into the hardware-based root of trust within device 330.

In at least one implementation, the security certificate may be cryptographically signed by certificate authority 310 using a private key specific to certificate authority 310, so that the security certificate could later be validated and verified by certificate authority 310 as authentic by using a public key paired with a private key associated with certificate authority 310 to validate the certificate. In some implementations, the security certificate could comprise the first public key that is paired with the first private key associated with industrial device 330. For example, in at least one implementation, certificate authority 310 could cryptographically sign the first public key that corresponds to the first private key associated with industrial device 330 by using a unique private key controlled by certificate authority 310 in order to generate the security certificate for industrial device 330.

In some implementations, computing system 301 could utilize certificate authority 310 to also provision a second public key belonging to certificate authority 310 for secure storage within industrial device 330 by embedding the second public key associated with certificate authority 310 into the hardware root of trust of device 330. In this manner, the second public key may be securely stored in the hardware root of trust within industrial device 330. The second public key associated with certificate authority 310 could later be used by industrial device 330 to validate license information received from certificate authority 310 that is cryptographically signed by the corresponding second private key of certificate authority 310.

Computing system 301 generates a device information package for industrial device 330 based on the security certificate for industrial device 330, wherein the device information package is encrypted with a first public key paired with the first private key associated with industrial device 330 and the device information package is signed by certificate authority 310 using a second private key associated with certificate authority 310 (402). The device information package comprises licensing information for industrial device 330. For example, the device information package could comprise a license to enable one or more functions of industrial device 330. In another example, the device information package could comprise a license for the features and functionality that a user of industrial device 330 desires to activate on device 330. In some implementations, certificate authority 310 could utilize the security certificate of industrial device 330 to generate a device information package containing a feature license unique to device 330 by encrypting the device information package with the first public key that corresponds to the first private key unique to device 330. In this manner, the license generated using the security certificate provisioned to industrial device 330 would therefore only be effective to unlock the specified features on industrial device 330, because only device 330 possesses the unique private key necessary to decrypt the license information.

In at least one implementation, computing system 301 utilizes certificate authority 310 in order to generate the device information package for industrial device 330 based on the security certificate for industrial device 330. For example, computing system 301 could load and execute certificate authority 310 in order to retrieve the security certificate for industrial device 330 and generate the device information package for industrial device 330 based on the security certificate for industrial device 330. In at least one implementation, the security certificate for industrial device 330 could comprise the first public key assigned to device 330, and computing system 301 could utilize the first public key from the security certificate in order to generate the device information package for industrial device 330 based on the security certificate. In some implementations, the first public key associated with industrial device 330 could be stored by certificate authority 310, which can then be used to generate the device information package for industrial device 330 by encrypting the device information package with the first public key that is paired with the first private key associated with industrial device 330.

In at least one implementation, computing system 301 could generate the device information package for industrial device 330 in response to receiving a license request from a user of industrial device 330. In some implementations, the license request could include the security certificate assigned to industrial device 330. For example, a user of industrial device 330 could utilize a function of device 330 to securely retrieve the security certificate from the hardware root of trust and transmit the security certificate along with the license request over communication network 320 for delivery to computing system 301 and certificate authority 310. As discussed above, when provisioning the security certificate for industrial device 330, certificate authority 310 could cryptographically sign the security certificate using a private key associated with certificate authority 310 in order to generate the security certificate for industrial device 330. Accordingly, in implementations where the security certificate is cryptographically signed by certificate authority 310 using a private key assigned to certificate authority 310, the security certificate could be validated and verified by certificate authority 310 as authentic using a public key paired with a private key associated with certificate authority 310. In some implementations, the public/private key pair used by certificate authority 310 to sign the security certificate may be the same, "second" public/private key pair used by certificate authority 310 to sign and verify the device information package. However, note that a different, "third" public/private key pair could be used by certificate authority 310 to sign and verify the security certificate for industrial device 330, rather than the "second" public/private key pair used by certificate authority 310 to sign and verify the device information package. Accordingly, in some implementations, certificate authority 310 may utilize a third private key to sign the security certificate for industrial device 330, such that the security certificate is signed by the third private key associated with certificate authority 310 instead of the different, "second" private key of authority 310 that may be used to sign the device information package.

As discussed above, in some implementations the security certificate could comprise the first public key that is paired with the first private key that is generated by and uniquely identifies industrial device 330. For example, in at least one implementation, when provisioning the security certificate for industrial device 330, certificate authority 310 could sign the first public key that corresponds to the first private key of industrial device 330 using a third private key controlled by certificate authority 310 in order to generate the security certificate for industrial device 330. In this case, when certificate authority 310 receives a license request for industrial device 330 along with its associated security certificate, certificate authority 310 could validate the security certificate in order to recover the first public key of device 330 by using the third public key of authority 310 that corresponds to the third private key of authority 310 that was used to cryptographically sign the security certificate. After validating the security certificate using the third public key of certificate authority 310 to recover the first public key of industrial device 330, certificate authority 310 could then use the first public key of device 330 to encrypt a feature license unique to device 330 within the device information package. Certificate authority 310 could then cryptographically sign the device information package by using the second private key associated with certificate authority 310. By encrypting the device information package with the first public key associated with industrial device 330, the license included in the package generated using the security certificate provisioned to device 330 would therefore only be effective to unlock the specified features on industrial device 330, because only device 330 possesses the unique first private key necessary to decrypt the license information.

Computing system 301 provides the device information package to industrial device 330, wherein industrial device 330 is configured to validate the device information package using a second public key paired with the second private key associated with certificate authority 310 and decrypt the device information package with the first private key associated with industrial device 330 (403). For example, after the device information package is encrypted using the first public key assigned to device 330 and then cryptographically signed using the second private key associated with certificate authority 310, computing system 301 then transfers the signed device information package for deployment on industrial device 330. In at least one implementation, upon receipt of the signed device information package, industrial device 330 validates the device information package by using the second public key associated with security authority 310, and then decrypts the device information package with the first private key associated with industrial device 330 to recover the license information. For example, industrial device 330 could retrieve the second public key stored in the hardware root of trust that corresponds to the second private key of certificate authority 310 and utilize the second public key of authority 310 to validate the signed device information package and verify that the package comprises authentic data provided by certificate authority 310. Upon successful validation, industrial device 330 could then utilize the first private key stored in the hardware root of trust to decrypt the device information package that was encrypted by certificate authority 310 using the first public key paired with the first private key of device 330.

Upon successfully decrypting the device information package, industrial device 330 is then able to apply the license and execute the licensed functionality of device 330. For example, to execute the licensed functionality, industrial device 330 may be configured to enable one or more functions of industrial device 330 based on the license included in the device information package. A user of industrial device 330 could then operate the one or more functions of industrial device 330 that were licensed by certificate authority 310.

Advantageously, the techniques described herein provide for secure provisioning of feature licensing for a specific industrial device 330. By utilizing a hardware root of trust to securely store a security certificate and cryptographic keys that provide a unique identity of industrial device 330, a device information package comprising a license to execute one or more functions of industrial device 330 may be uniquely created for only device 330, and which cannot be used on any other industrial devices. For example, if a user attempts to utilize the license provided to industrial device 330 in the device information package with a different industrial device, the license would not be enabled for that other device because that device would lack the first private key specific to industrial device 330 that is necessary to decrypt the device information package and obtain the license. In order to transfer the license for industrial device 330 to another industrial device, the user would have to contact certificate authority 310 to authorize the license transfer. In order to transfer the license, certificate authority 310 could first issue a revocation of the license to industrial device 330, where industrial device 330 is configured to revoke the license to disable one or more functions of industrial device 330 based on the revocation. Further, in at least one implementation, after revoking the license, industrial device 330 may be configured to generate a record that indicates the license was revoked and sign the record using the first private key associated with industrial device 330. Certificate authority 310 may then issue a new license and new device information package specific to the new industrial device by using a security certificate unique to that device, and the new device information package could then be used to enable the licensed functionality on that new device. In this manner, the techniques described herein provide for secure provisioning of feature licensing uniquely for individual industrial devices.

Now referring back to FIGS. 1 and 3, computing systems 101 and 301 individually comprise a processing system and communication transceiver. Computing systems 101 and 301 may also include other components such as a user interface, data storage system, and power supply. Computing systems 101 and 301 may each individually reside in a single device or may be distributed across multiple devices. Examples of computing systems 101 and 301 include mobile computing devices, such as cell phones, tablet computers, laptop computers, notebook computers, and gaming devices, as well as any other type of mobile computing devices and any combination or variation thereof. Examples of computing systems 101 and 301 also include desktop computers, server computers, and virtual machines, as well as any other type of computing system, variation, or combination thereof. In some implementations, computing systems 101 and 301 could individually comprise a mobile device capable of operating in a server-like fashion which, among other uses, could be utilized in a wireless mesh network.

Communication networks 120 and 320 could comprise multiple network elements such as routers, gateways, telecommunication switches, servers, processing systems, or other communication equipment and systems for providing communication and data services. In some examples, communication networks 120 and 320 could comprise wireless communication nodes, telephony switches, Internet routers, network gateways, computer systems, communication links, or some other type of communication equipment, including combinations thereof. Communication networks 120 and 320 may also comprise optical networks, packet networks, cellular networks, wireless mesh networks (WMN), local area networks (LAN), metropolitan area networks (MAN), wide area networks (WAN), or other network topologies, equipment, or systems, including combinations thereof. Communication networks 120 and 320 may be configured to communicate over metallic, wireless, or optical links. Communication networks 120 and 320 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication networks 120 and 320 could include further access nodes and associated equipment for providing communication services to several computer systems across a large geographic region.

Industrial devices 130 and 330 generally comprise a processing system and communication transceiver, although some industrial devices 130 and 330 may not comprise such elements in some examples, such as data sensors and other more simplistic devices. Industrial devices 130 and 330 may each individually reside in a single device or may be distributed across multiple devices. Industrial devices 130 and 330 may each be a discrete system or may be integrated within other systems, including other systems within a communication system, an industrial automation environment, an automation control system, or any other system. Industrial devices 130 and 330 could comprise industrial controllers, motion drives, communication devices, sensors, data transmitters, HMI hardware systems, and other industrial automation equipment. In examples where industrial devices 130 and 330 comprise industrial controllers, industrial devices 130 and 330 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial devices 130 and 330. In some examples, industrial devices 130 and 330 could individually comprise a ControlLogix® control system provided by Rockwell Automation, Inc.

Turning now to FIG. 5, a block diagram that illustrates an industrial automation environment 500 in an exemplary implementation is shown. Industrial automation environment 500 provides an example of an industrial automation environment that may be utilized to implement the feature licensing processes disclosed herein, but other environments could also be used. Industrial automation environment 500 includes computing system 510, machine system 520, industrial controller 525, database system 530, and application integration platform 535. Computing system 510 provides an example of computing systems 101 and 301, although systems 101 and 301 could use alternative configurations. Industrial controller 525 provides an example of industrial devices 130 and 330, although devices 130 and 330 could use alterative configurations. Machine system 520 and controller 525 are in communication over a communication link, controller 525 and database system 530 communicate over a communication link, database system 530 and application integration platform 535 communicate over a communication link, and application integration platform 535 and computing system 510 are in communication over a communication link. Note that there would typically be many more machine systems in most industrial automation environments, but the number of machine systems shown in FIG. 5 has been restricted for clarity.

Industrial automation environment 500 comprises an industrial mining operation, automobile manufacturing factory, food processing plant, oil drilling operation, microprocessor fabrication facility, or some other type of industrial enterprise. Machine system 520 could comprise a sensor, drive, pump, filter, drill, motor, robot, fabrication machinery, mill, printer, or any other industrial automation equipment, including their associated control systems. A control system comprises, for example, industrial controller 525, which could include automation controllers, programmable logic controllers (PLCs), programmable automation controllers (PACs), or any other controllers used in automation control. Additionally, machine system 520 could comprise other industrial equipment, such as a brew kettle in a brewery, a reserve of coal or other resources, or any other element that may reside in an industrial automation environment 500.

Machine system 520 continually produces operational data over time. The operational data indicates the current status of machine system 520, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 520 and/or controller 525 is capable of transferring the operational data over a communication link to database system 530, application integration platform 535, and computing system 510, typically via a communication network. Database system 530 could comprise a disk, tape, integrated circuit, server, or some other memory device. Database system 530 may reside in a single device or may be distributed among multiple memory devices.

Application integration platform 535 comprises a processing system and a communication transceiver. Application integration platform 535 may also include other components such as a router, server, data storage system, and power supply. Application integration platform 535 may reside in a single device or may be distributed across multiple devices. Application integration platform 535 may be a discrete system or may be integrated within other systems, including other systems within industrial automation environment 500. In some examples, application integration platform 535 could comprise a FactoryTalk® VantagePoint server system provided by Rockwell Automation, Inc.

The communication links over which data is exchanged between machine system 520, industrial controller 525, database system 530, application integration platform 535, and communication interface 508 of computing system 510 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, cellular networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 510 may be representative of any computing apparatus, system, or systems on which the feature licensing processes disclosed herein or variations thereof may be suitably implemented. Computing system 510 provides an example of a computing system that could be used as a either a server or a client device in some implementations, although such devices could have alternative configurations. Examples of computing system 510 include mobile computing devices, such as cell phones, tablet computers, laptop computers, notebook computers, and gaming devices, as well as any other type of mobile computing devices and any combination or variation thereof. Examples of computing system 510 also include desktop computers, server computers, and virtual machines, as well as any other type of computing system, variation, or combination thereof. In some implementations, computing system 510 could comprise a mobile device capable of operating in a server-like fashion which, among other uses, could be utilized in a wireless mesh network.

Computing system 510 includes processing system 501, storage system 503, software 505, communication interface 508, and user interface 509. Processing system 501 is operatively coupled with storage system 503, communication interface 508, and user interface 509. Processing system 501 loads and executes software 505 from storage system 503. Software 505 includes application 506 and operating system 507. Application 506 may include feature licensing process 400 in some examples. When executed by computing system 510 in general, and processing system 501 in particular, software 505 directs computing system 510 to operate as described herein for feature licensing process 400 or variations thereof. In this example, user interface 509 includes display system 511, which itself may be part of a touch screen that also accepts user inputs via touches on its surface. Computing system 510 may optionally include additional devices, features, or functionality not discussed here for purposes of brevity.

Turning now to FIG. 6, a block diagram is shown that illustrates computing system 600 in an exemplary implementation. Computing system 600 provides an example of computing system 101 or any computing system that may be used to execute feature licensing process 400 or variations thereof, although computing system 101 could use alternative configurations. Computing system 600 includes processing system 601, storage system 603, software 605, communication interface 607, and user interface 609. User interface 609 comprises display system 608. Software 605 includes application 606 which itself includes feature licensing process 400. Feature licensing process 400 may optionally be implemented separately from application 606, as indicated by the dashed line in FIG. 6.

Computing system 600 may be representative of any computing apparatus, system, or systems on which application 606 and feature licensing process 400 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for feature licensing process 400 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 may load and execute portions of software 605, such as feature licensing process 400, to render a graphical user interface for application 606 for display by display system 608 of user interface 609. Software 605 may be implemented in program instructions and among other functions may, when executed by computing system 600 in general or processing system 601 in particular, direct computing system 600 or processing system 601 to provision a security certificate for an industrial device based on a first private key associated with the industrial device, wherein the first private key is securely stored in a hardware root of trust within the industrial device. Software 605 may further direct computing system 600 or processing system 601 to generate a device information package for the industrial device based on the security certificate for the industrial device, wherein the device information package is encrypted with a first public key paired with the first private key associated with the industrial device and the device information package is signed by a certificate authority using a second private key associated with the certificate authority. In addition, software 605 directs computing system 600 or processing system 601 to provide the device information package to the industrial device, wherein the industrial device is configured to validate the device information package using a second public key paired with the second private key associated with the certificate authority and decrypt the device information package with the first private key associated with the industrial device.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate feature licensing of industrial devices employed in an industrial automation environment as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or feature licensing process 400 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as display system 608, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method for licensing features of industrial devices employed in an industrial automation environment, the method comprising:
   signing, by a certificate authority, a security certificate for an industrial controller using a first private key unique to the industrial controller, wherein the first private key and the security certificate are securely stored in a hardware root of trust within the industrial controller;
   validating, by the certificate authority, the security certificate provided by the industrial controller;
   encrypting, by the certificate authority, a device information package comprising a license to enable one or more functions of the industrial controller with a first public key paired with the first private key;
   signing, by the certificate authority, the encrypted device information package using a second private key assigned to the certificate authority; and
   providing, by the certificate authority, the encrypted and signed device information package to the industrial controller, wherein at the industrial controller, the encrypted and signed device information package is validated using a second public key paired with the second private key and decrypted with the first private key, and the one or more functions of the industrial controller are enabled based on the license included in the device information package.

2. The method of claim 1 further comprising receiving, by the certificate authority, a request for the license from the industrial controller, wherein the request for the license includes the security certificate.

3. The method of claim 1 further comprising issuing, by the certificate authority, a revocation of the license to the industrial controller, wherein at the industrial controller, the license is revoked to disable the one or more functions of the industrial controller based on the revocation.

4. The method of claim 3 wherein at the industrial controller, a record is generated that indicates the license was revoked and the record is signed using the first private key unique to the industrial controller.

5. The method of claim 1 wherein the second public key is securely stored in the hardware root of trust within the industrial controller.

6. The method of claim 1 wherein the security certificate is signed by a third private key associated with the certificate authority.

7. A non-transitory computer-readable medium having stored thereon instructions that, in response to execution, cause a certificate authority to perform operations, the operations comprising:
   signing a security certificate for an industrial controller using a first private key unique to the industrial controller, wherein the first private key and the security certificate are securely stored in a hardware root of trust within the industrial controller;
   validating the security certificate provided by the industrial controller;
   encrypting a device information package comprising a license to enable one or more functions of the industrial controller with a first public key paired with the first private key;
   signing the encrypted device information package using a second private key assigned to the certificate authority; and
   providing the encrypted and signed device information package to the industrial controller, wherein at the industrial controller, the encrypted and signed device information package is validated using a second public key paired with the second private key and decrypted with the first private key, and the one or more functions of the industrial controller are enabled based on the license included in the device information package.

8. The non-transitory computer-readable medium of claim 7 wherein the operations further comprise receiving a request for the license from the industrial controller, wherein the request for the license includes the security certificate.

9. The non-transitory computer-readable medium of claim 7 wherein the operations further comprise issuing a revocation of the license to the industrial controller, wherein at the industrial controller, the license is revoked to disable the one or more functions of the industrial controller based on the revocation.

10. The non-transitory computer-readable medium of claim 9 wherein at the industrial controller, a record is generated that indicates the license was revoked and the record is signed using the first private key unique to the industrial controller.

11. The non-transitory computer-readable medium of claim 7 wherein the second public key is securely stored in the hardware root of trust within the industrial controller.

12. The non-transitory computer-readable medium of claim 7 wherein the security certificate is signed by a third private key associated with the certificate authority.

13. A system for licensing features of industrial devices employed in an industrial automation environment, the system comprising:
   a memory that stores executable components; and
   a processor, operatively coupled to the memory, that executes the executable components, the executable components comprising program instructions stored on the memory that, when executed by the processor, direct the processor to at least:
   sign a security certificate for an industrial controller using a first private key unique to the industrial controller, wherein the first private key and the security certificate are securely stored in a hardware root of trust within the industrial controller;
   validate the security certificate provided by the industrial controller;
   encrypt a device information package comprising a license to enable one or more functions of the industrial controller with a first public key paired with the first private key;
   sign the encrypted device information package using a second private key assigned to the certificate authority; and
   provide the encrypted and signed device information package to the industrial controller, wherein at the industrial controller, the encrypted and signed device information package is validated using a second public key paired with the second private key and decrypted with the first private key, and the one or more functions of the industrial controller are enabled based on the license included in the device information package.

14. The system of claim 13 wherein the executable components comprising the program instructions further direct the processor to receive a request for the license from the industrial controller, wherein the request for the license includes the security certificate.

15. The system of claim 13 wherein the executable components comprising the program instructions further direct the processor to issue a revocation of the license to the industrial controller, wherein at the industrial controller, the license is revoked to disable the one or more functions of the industrial controller based on the revocation.

16. The system of claim 15 wherein at the industrial controller, a record is generated that indicates the license was revoked and the record is signed using the first private key unique to the industrial device.

17. The system of claim 13 wherein the second public key is securely stored in the hardware root of trust within the industrial controller.

18. The method of claim 1 further comprising generating, by the certificate authority, the first private key and the first public key.

19. The method of claim 1 wherein the first private key and the security certificate are securely stored in the hardware root of trust within the industrial controller during manufacturing of the industrial controller.

20. The method of claim 4 further comprising receiving, by the certificate authority, the signed record from the industrial controller and verifying the revocation.

* * * * *